(12) United States Patent
Alhabib et al.

(10) Patent No.: US 12,169,488 B2
(45) Date of Patent: Dec. 17, 2024

(54) LOCAL CONTENT ENRICHMENT PLATFORM THAT USES DISTRIBUTED LEDGER TECHNOLOGY

(71) Applicant: SAUDI ARABIAN OIL COMPANY, Dhahran (SA)

(72) Inventors: Abdulhakim Abdullah Alhabib, Dhahran (SA); Abdulaziz Saud Almuhaisin, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/298,288

(22) Filed: Apr. 10, 2023

(65) Prior Publication Data
US 2024/0338357 A1  Oct. 10, 2024

(51) Int. Cl.
*G06F 16/23* (2019.01)
(52) U.S. Cl.
CPC .............................. *G06F 16/2379* (2019.01)
(58) Field of Classification Search
CPC ... H04L 2209/56; G06F 16/27; G06F 16/182; G06F 16/2379
USPC ......................................................... 707/703
See application file for complete search history.

(56) References Cited

U.S. PATENT DOCUMENTS

| 2023/0036439 A1* | 2/2023 | Olson | H04L 9/3236 |
| 2023/0237349 A1* | 7/2023 | Donoho | G06Q 50/26 706/46 |

FOREIGN PATENT DOCUMENTS

MX     2017002233 A     8/2018

* cited by examiner

*Primary Examiner* — Hung T Vy
(74) *Attorney, Agent, or Firm* — Vorys, Sater, Seymour and Pease LLP (57) ABSTRACT

The present disclosure relates to recording and tracking a local content enrichment submission via a local content enrichment platform that leverages distributed ledger technology. The system can comprise a memory to store computer executable instructions. Also, the system can comprise one or more processors, operatively coupled to the memory, that execute the computer executable instructions to implement a blockchain layer configured to record a local content enrichment submission to a distributed ledger and track a status of the local content enrichment submission via transactions with the distributed ledger. The local content enrichment submission includes data characterizing a proposal of an entity to comply with local content regulations of a region.

15 Claims, 4 Drawing Sheets

LOCAL CONTENT ENRICHMENT PLATFORM THAT USES DISTRIBUTED LEDGER TECHNOLOGY

FIELD OF THE DISCLOSURE

The present disclosure relates generally to systems and/or methods that employ a distributed ledger to execute a local content enrichment platform ("LCEP") and, more particularly, to the use of decentralized and immutable distributed ledger technology to provide an optimized process for managing and/or complying with local content requirements.

BACKGROUND OF THE DISCLOSURE

Local content requirements refer to regulations and/or policies that require a business and/or organization to derive a certain amount of the final value of a good or service from domestic endeavors, such as by: purchasing from local companies, manufacturing goods locally, developing goods locally, and/or providing local services. Often a foreign investor desiring to conduct business within a region must comply with the region's local content requirements, which are designed and/or enforced to promote the region's domestic economy. For example, local content requirements are typically designed to increase the extent to which local companies and citizens are able to participate in the workforce and supply chains of a given business sector.

Public and private sector organizations can utilize local content requirements to broaden economic value within a region and/or periodically measure the index of foreign vendors and/or investors. For example, some factors that can be used to measure the local content contribution of a given vendor can include: the employment of local nationals, procurement of goods and/or services from local suppliers, partnerships with local entities, localized development of emerging technologies and/or infrastructure, and/or the improvement of the skills and/or capacity of local businesses and the domestic workforce.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a system is provided. The system can comprise a memory to store computer executable instructions. Also, the system can comprise one or more processors, operatively coupled to the memory, that execute the computer executable instructions to implement a blockchain layer configured to record a local content enrichment submission to a distributed ledger and track a status of the local content enrichment submission via transactions with the distributed ledger. The local content enrichment submission includes data characterizing a proposal of an entity to comply with local content regulations of a region.

In another embodiment, a method is provided. The method can comprise recording a local content enrichment submission to a distributed ledger, wherein the local content enrichment submission includes data characterizing a proposal of an entity to comply with local content regulations of a region. The method can also comprise tracking a status of the local content enrichment submission via transactions with the distributed ledger.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Embodiments of the present disclosure will now be described in detail with reference to the accompanying figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

To comply with a region's local content requirements ("LCRs"), enrichment entities (e.g., business entities investing into one or more business endeavors within a given region) are typically required to submit one or more local content enrichment ("LCE") packages to a local content and government procurement authority ("LCGPA"). The LCE package can be prepared using pre-determined forms and authenticated supporting documents. Initially, the prepared LCE package is submitted to a pre-approved third party certifier for auditing. For instance, the third party certifier can be tasked to verify the accuracy, plausibility, and/or extent of the assertions presented in the LCE package. Upon completion of the audit, the third party certifier can generate a certification report and share it with the enrichment entity associated with the LCE submission. The certification report can include a service level agreement ("SLA") characterizing terms and conditions for executing one or more proposals of the LCE submission. Subsequently, the LCE submission and certification report can be appended to form an LCE package, which can be submitted to the regional certifier (e.g., LCGPA) for approval. The regional certifier may request revisions to the LCE package, in response to which the enrichment entity may revise and resubmit the LCE package for further review. The process can continue, repeating one or more steps, until the LCE package is approved by the regional certifier (e.g., LCGPA). Thus, typical processing of LCE packages can be a time consuming and costly endeavor, involving communication and coordination between multiple parties in a manner that can lack transparency and cooperation.

Embodiments in accordance with the present disclosure generally relate to systems and/or computer-implemented methods for implementing a local content enrichment platform ("LCEP") that utilizes distributed ledger technology to manage the governance of LCR compliance. For example, the LCEP can leverage distinct features of distributed ledger technology (e.g., such as immutability, traceability, high-security, and/or smart contract functionality) to optimize the process of preparing, submitting, and reviewing LCE packages. One or more embodiments described herein can provide for a blockchain consortium of enrichment entities (e.g., business entities), pre-approved third party certifiers, and/or regional certifiers (e.g., LCGPAs) involved in the LCE process (e.g., compliance with LCRs). For example, one or more embodiments described herein can include the use of one more blockchains to provide a streamlined and transparent process for entities (e.g., business entities, such as investors) to meet government obligations and comply with LCRs, contract tendering, and/or reporting requirements.

For instance, a blockchain can be employed as a unified, shared distributed ledger for a single source of truth for LCE package submissions and status updates, whereby the blockchain can serve as a shared, secured, and/or encrypted repository. Additionally, smart contracts can be employed to enforce initial compliance rules and/or determine corresponding third party certifiers for LCE submissions. Further, certification reports and/or the LCE packages can be swiftly appended and/or updated via a blockchain transaction.

Moreover, various embodiments described herein can constitute one or more technical improvements over conventional LCR protocols by employing blockchain technology that can enable enrichment entities, third party certifiers, and/or regional certifiers (e.g., LCGPAs) to participate in a unified LCEP with a shared system of records (e.g., a distributed ledger) to provide transparency between party communications and/or tasks. For instance, various embodiments described herein can utilize smart contracts to convey status alerts regarding a pending LCE submission and/or LCE package. Additionally, one or more embodiments described herein can have a practical application by enabling a transparent process (e.g., utilizing a single, auditable source for recording documents and tracking status updates) that fosters standardization and efficiency.

Figure 1:
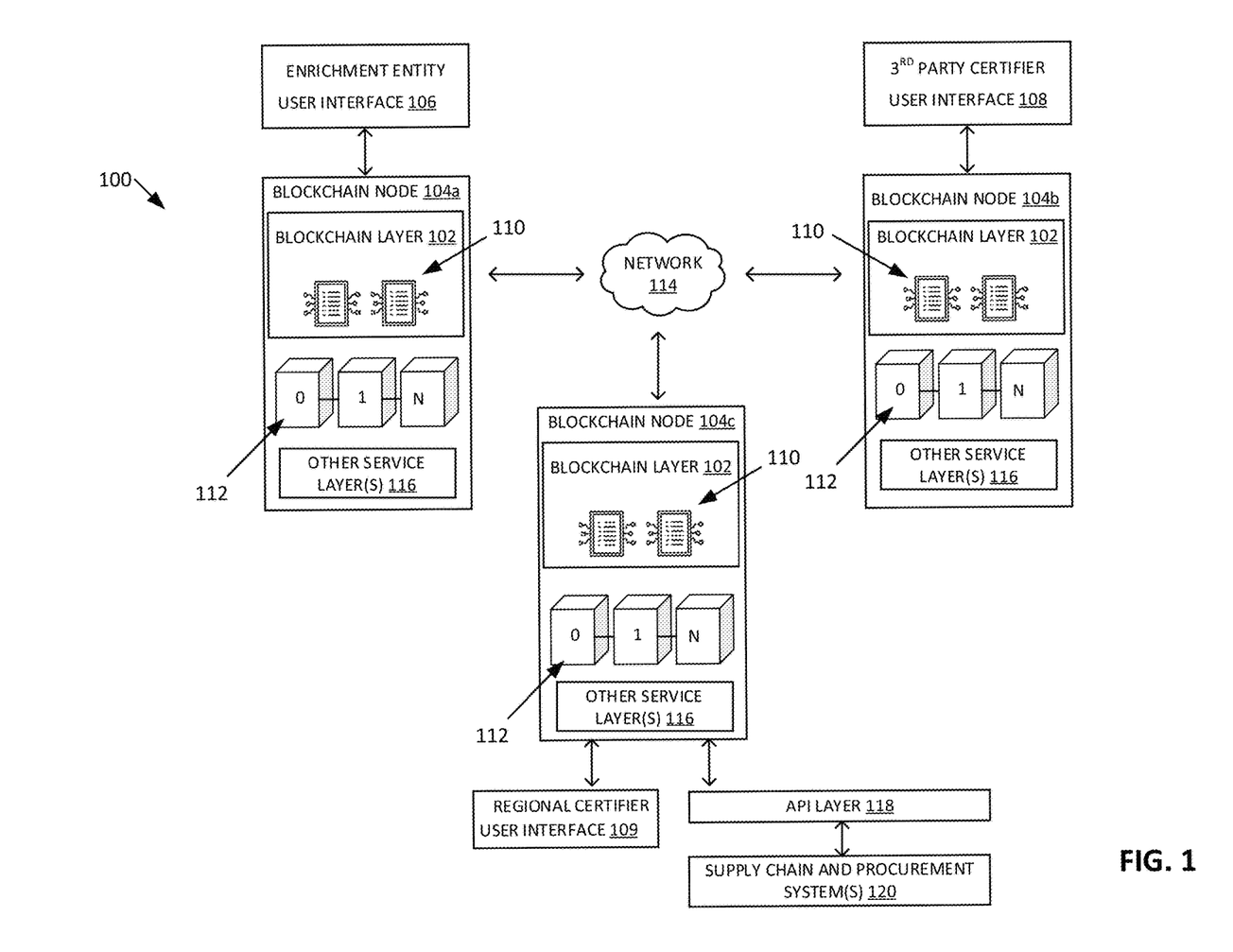
FIG. 1 is a diagram of a non-limiting example system that can utilize a distributed ledger to track and record local content enrichment submissions in accordance with one or more embodiments described herein.

FIG. 1 illustrates a non-limiting example system 100 that can comprise the one or more blockchain layers 102 distributed amongst a plurality of blockchain nodes 104 (e.g., networked computers), which can be managed and/or operated by one or more enrichment entities, third party certifiers, and/or regional certifiers (e.g., LCGPAs) in accordance with one or more embodiments described herein. As shown in FIG. 1, a first blockchain node 104a can communicate with one or more enrichment entity user interfaces 106, which can be employed to enable one or more users (not shown) associated with the enrichment entity (e.g., a business entity) to interact with the one or more blockchain layers 102. Likewise, one or more second blockchain nodes 104b can communicate with one or more third party certifier user interfaces 108, which can be employed to enable one or more users associated with the third party certifiers contracted by the enrichment entity and/or a regional certifier (e.g., LCGPA) to interact with the one or more blockchain layers 102. Further, one or more third blockchain nodes 104c can communicate with one or more regional certifier user interfaces 109, which can be employed to enable one or more users associated with the region certifier to interact with the one or more blockchain layers 102. For example, the enrichment entity user interface 106 can be employed to generate one or more LCE submissions, the third party certifier user interface 108 can be employed to evaluate LCE submissions and/or generate certification reports, and the regional certifier user interface 109 can be employed to evaluate LCE packages in accordance with various embodiments described herein. The enrichment entity user interface 106, the third party certifier user interface 108, and/or the regional certifier user interface 109 can be embodied a mobile devices, web pages, service-specific computer equipment, a combination thereof, and/or the like.

The blockchain layer 102 can provide one or more smart contracts 110 and/or blockchains 112, which can be shared amongst the blockchain nodes 104 via one or more networks 114. In various embodiments described herein, the smart contracts 110 and/or blockchains 112 can ensure shared verification controls, common data review, and/or tamper-proof records across the blockchain nodes 104. As described further below, the smart contracts 110 can be encoded to correlate one or more LCE submissions with one or more third party certifiers. Further, the smart contracts 110 can generate one or more alerts and/or notifications that inform a third party certifier of a matched LCE submission. For example, the one or more alerts and/or notifications can be presented to the third party certifier via the one or more third party certifier user interfaces 108.

In various embodiments, the blockchain 112 is a distributed ledger that stores data in the form of blocks correlated in sequential order to form a chain. For instance, FIG. 1 depicts an exemplary representation of the blockchain 112 as a blockchain comprising a number of blocks (e.g., block 0, block 1, and block N). A block is the primary data structure in a blockchain 112 defined by the blockchain layer 102, where each block describes a linked group of data records. For example, blocks can represent one or more LCE submissions, certification reports, and/or LCE packages together with its associated transaction data and may include reference to other blocks (e.g., comprising historic data) in the blockchain 112 that it represents. For instance, the blocks can store data entered into the system 100 via the enrichment entity user interface 106, the third party certifier user interface 108, and/or the regional certifier user interface 109 along with transaction data facilitated by the blockchain layer 102. In various embodiments, each block can represent one or more LCE submissions and details regarding the LCE submission including, but not limited to: pre-defined LCE submission forms populated with relevant information regarding a proposed business endeavor, supporting documentation provided by one or more enrichment entities, certification reports characterizing one or more authentication and/or verification processes performed by a third party certifier, service level agreements associated with the LCE submissions, comments and/or remarks regarding an LCE package by one or more regional certifiers (e.g., LCGPAs), a combination thereof, and/or the like. Within each block, stored data can be hashed to enhance data security. For example, each block subsequent to the first block can contain a hash of a previous block and a time stamp representing the time at which the block was created.

The one or more networks 114 can comprise one or more wired and/or wireless networks, including, but not limited to: a cellular network, a wide area network ("WAN"), a local area network ("LAN"), a combination thereof, and/or the like. One or more wireless technologies that can be comprised within the one or more networks 114 can include, but are not limited to: wireless fidelity ("Wi-Fi"), a WiMAX network, a wireless LAN ("WLAN") network, BLUETOOTH® technology, a combination thereof, and/or the like. For instance, the one or more networks 114 can include the Internet and/or the IoT. In various embodiments, the one or more networks 114 can comprise one or more transmission lines (e.g., copper, optical, or wireless transmission lines), routers, gateway computers, and/or servers. Further, the one or more blockchain nodes 104 can comprise one or more network adapters and/or interfaces (not shown) to facilitate communications via the one or more networks 114.

As shown in FIG. 1, the system 100 can comprise multiple blockchain nodes 104 in communication with each other via the one or more networks 114. In various embodiments, respective blockchain nodes 104 can be maintained and/or operated by respective entities utilizing the system 100. In various embodiments, an enrichment entity, third party certifier, and/or regional certifier can be associated with multiple blockchain nodes 104. Further, while three example blockchain nodes 104 are depicted in FIG. 1, embodiments comprising fewer or more blockchain nodes 104 are also envisaged.

In one or more embodiments, each blockchain node 104 can store and/or manage a respective copy of the blockchain 112, where each copy can be updated as a block and added to the blockchain 112. Additionally, each blockchain node 104 can execute a similar version of the one or more smart contracts 110 executed on the blockchain layer 102. In various embodiments, the various blockchain nodes 104 can communicate with each other over the one or more networks 114 to gain agreement on the contents of the blockchain 112 without a central authority coordinating and validating transactions. For instance, the system 100 can require consensus between the blockchain nodes 104 on the validity of a proposed transaction before a block can be created and the blockchain 112 updated. In various embodiments, the system 100 can utilize a selective consensus based on a byzantine fault tolerance mechanism to validate transaction data.

Respective entities utilizing the system 100 can send transaction requests (e.g., via one or more enrichment entity user interfaces 106, third party certifier user interfaces 108, and/or regional certifier user interfaces 109), in accordance with various embodiments described further below, to the blockchain layer 102 to perform operations defined in one or more smart contracts 110 and/or store information on the blockchain 112. Once a transaction request is completed, a record of the transaction is added to the blockchain 112 (e.g., stored within one or more additional blocks to the blockchain), after which the recorded transaction cannot be altered or removed. Thereby, the blockchain 112 can be embodied as an immutable chain of stored data transactions.

In accordance with various embodiments described herein, the blockchain layer 102 can be provided by each blockchain node 104 to execute services necessary for transaction execution based on the blockchain 112, where such services can include the one or more smart contracts 110. For example, the blockchain layer 102 can include one or more computer programs to execute the features described further herein (e.g., recordation and/or authentication of: LCE submissions, certification reports, LCE package revisions, supporting documentation, and/or reviewer commentary). In one or more embodiments, the blockchain nodes 104 can also provide one or more other service layers 116, such as membership services and/or cryptography services. For example, membership services can manage identity, privacy, confidentiality, and/or auditability across the network 114 of blockchain nodes 104. For instance, membership services can be executed on permissioned blockchains 112, where specific actors are allowed to submit and/or validate transactions. In another example, cryptography services can provide integrity for messages between blockchain nodes 104 and/or ensure operations of the blockchain layer 102 are directed by authorized entities; thereby safeguarding the blockchain 112 from alterations other than the addition of new block of transaction data.

In one or more embodiments, one or more enrichment entities can employ the enrichment entity user interface 106 to supply one or more LCE submissions to the blockchain layer 102. The enrichment entities can be, for example, one or more business entities seeking to engage in, and/or develop, one or more business endeavors (e.g., the purchase, sale, or manufacturing of goods and/or services) within a given region regulated by one or more LCRs. The LCE submissions can include, for example: details regarding the location, scope, and/or duration of one or more business endeavors proposed for execution in the given region; details regarding a plan to increase the procurement of domestic goods and/or services (e.g., domestic to a given region associated with LCRs to which the LCE submission is directed); details regarding the current and/or future employment opportunities for citizens of the region; details regarding the current and/or future occupation training opportunities for citizens of the region; details regarding development plans for domestic supply chains; a combination thereof, and/or the like. In various embodiments, the LCE submission can be prepared by completing one or more pre-defined forms (e.g., which can be provided by one or more regional certifiers) that standardize the intake and/or delineation of necessary LCR compliance details. Additionally, the LCE submission can include supporting documentation that can elaborate upon one or more details outlined in the pre-defined forms. Example supporting documentation that may be included in the LCE submission can include, but are not limited to: proof of local labor compensation, such as employee related expenses and/or expenses paid or payable to employees (e.g., documentation delineating salaries, wages, bonuses, commissions, overtime allowances, housing allowances, end of service payments, and/or the like); proof of purchases of local goods and/or services, such as invoices (e.g., including a description of the nature of the goods and/or services) and/or expenditure lists (e.g., detailing a list of suppliers and expenses associated with each supplier); proof of capacity building, such as a list of expenses related to training local labor, developing local supply chains, and/or progressing local research and development (e.g., where research can include an original and planned study carried out with the expectation of acquiring new scientific technical knowledge and/or understanding, and development can be the application of research findings or other knowledge to a plan or design to produce substantially new or improved raw materials, devices, products, processes, systems, or services), a combination thereof, and/or the like. In various embodiments, the blockchain layer 102 can record the one or more LCE submissions to the blockchain 112.

In one or more embodiments, the LCE submissions can include a local content score derived in accordance with one more LCRs and/or stipulations by the regional certifiers. For example, the one or more enrichment entities can compute the local content score and include the commuted local content score in the LCE submission. In another example, the one or more third party certifiers can compute the local content score based on the content included in the LCE submission and include the computed local content score in one or more certification reports. In a still further example, the one or more smart contracts 110 can compute the local content score in response to the one or more enrichment entities supplying an LCE submission to the blockchain layer 102.

In various embodiments, the local content score can be a function of value contributed to the region (e.g., from depreciation and amortization, labor, goods and services, citizen training, supplier development, and/or research and development) in comparison to the planned total cost related to execution of the LCE submission in terms of operating expenses (e.g., costs of wages, goods and services, capacity building, and/or depreciation and amortization of assets). In one or more embodiments, the local content score ("$LC_{score}$") can be computed in accordance with Equation 1, below.

$$LC_{score} = \frac{LC_{GS} + LC_{AD} + LC_{LC} + LC_{CB}}{TC_{GS} + TC_{AD} + TC_{LC} + TC_{CB}} \quad (1)$$

Where "$LC_{GS}$" can be a metric of the amount of local procurement of goods and/or services contributed to the region, "$LC_{AD}$" can be a metric of local depreciation and amortization (e.g., across multiple asset classes), "$LC_{LC}$" can be a metric of local planned labor compensation associated with executing the LCE submission, and/or "$LC_{CB}$" can be a metric of local capacity building (e.g., via planned expenses to be spent on the training of local citizens, the development of local supply chains, and/or local research and development endeavors). The local content metrics (e.g., $LC_{GS}$, $LC_{AD}$, $LC_{LC}$, and/or $LC_{CB}$) can be compared to the total cost of each category in executing the proposals of the LCE submission. For example, "$TC_{GS}$" can be a metric of the amount of total procurement of goods and/or services associated with executing the proposals of the LCE submission, "$TC_{AD}$" can be a metric of total depreciation and amortization (e.g., across multiple asset classes), "$TC_{LC}$" can be a metric of total planned labor compensation associated with executing the LCE submission, and/or "$TC_{CB}$" can be a metric of total capacity building.

In one or more embodiment, one or more smart contracts 110 can be activated based on the entry of an LCE submission to the blockchain layer 102 and/or the recording of an LCE submission to the blockchain 112. In various embodiments, a generic smart contract 110 can be activated or a business sector specific smart contract 110 can be activated based on the LCE submission. The one or more smart contracts 110 can, for example, enforce initial compliance rules and/or match a recorded LCE submission to a third party certifier. For example, the one or more smart contracts 110 can perform an initial screening of LCE submissions recorded to the blockchain layer 102. The initial screening can be based on one or more defined rules regarding input data defined by the LCE submission. For instance, the one or more smart contracts 110 can determine whether the local content score associated with an LCE submission is greater than a predefined threshold. Where an LCE submission is associated with a local content score below the predefined threshold, the one or more smart contracts 110 can be configured to generate one or more alerts notifying the enrichment entity of the local content score requirement and/or inviting the enrichment to update and re-submit the LCE submission. Where the LCE submission is associated with a local content score greater than or equal to the predefined threshold, the one or more smart contracts 110 can further match the LCE submission package to one or more third party certifiers in accordance with one or more embodiments described herein.

Figure 2:
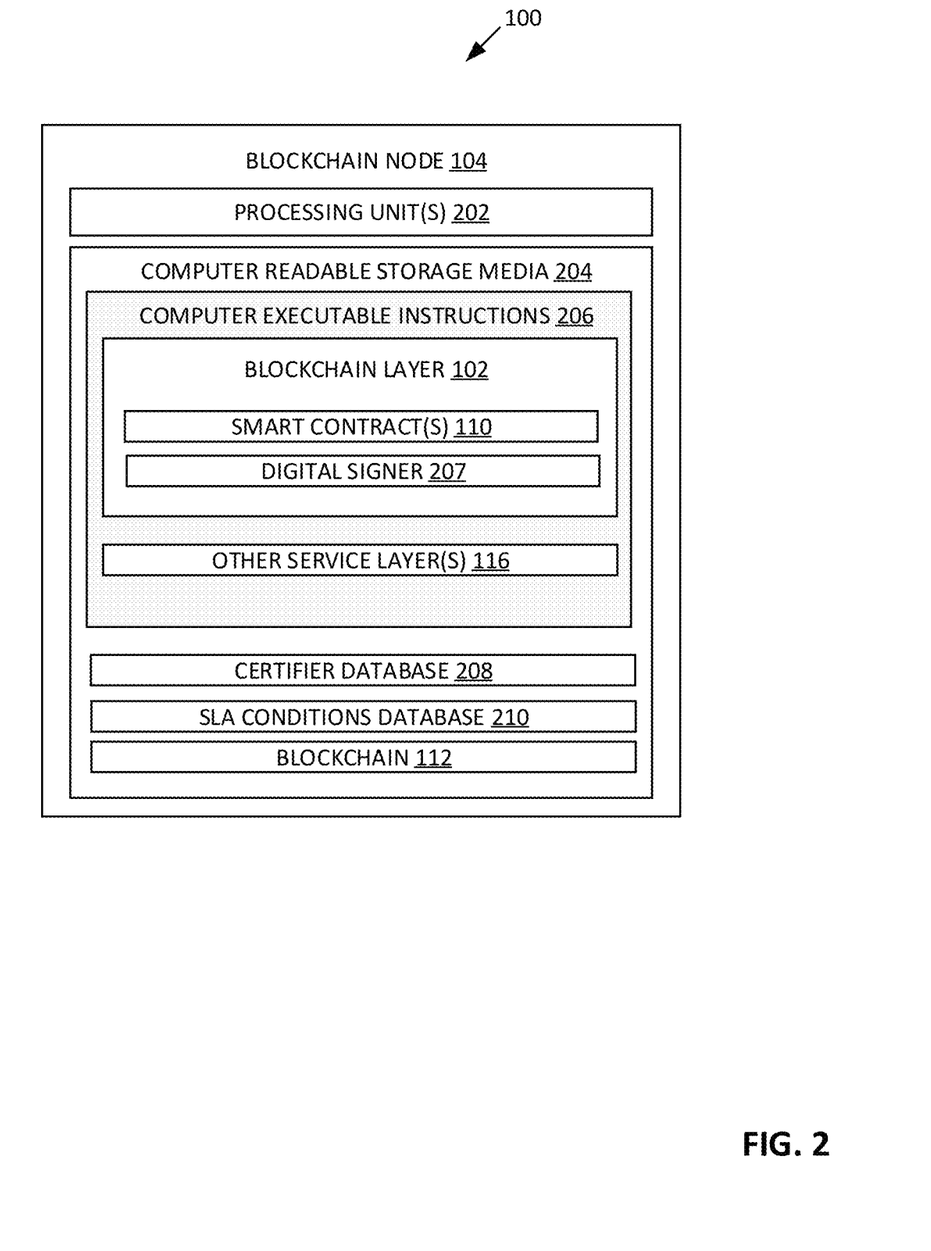
FIG. 2 is a diagram of a non-limiting example system that can utilize one or more smart contracts to track the status of one or more local content enrichment submissions in accordance with one or more embodiments described herein.

In one or more embodiments, the one or more smart contracts 110 can be configured to compute a local content score (e.g., in accordance with Equation 1) for one or more LCE submissions supplied to the blockchain layer 102 by the one or more enrichment entities. For instance, the one or more LCE submissions can include details populated into one or more predefined forms and/or templates (e.g., comprising pre-defined data fields). Thereby, the one or more smart contracts 110 can compute the local content score, and/or one or more metrics thereof, by retrieving the relevant data from pre-defined data fields of the one or more templates and/or forms included in the LCE submission. Further, in one or more embodiments, the one or more smart contracts 110 can retrieve data relevant to the local content score determination from one or more external databases (not shown) (e.g., which can be stored on one or more of the blockchain nodes 104 and/or accessible via one or more APIs). Moreover, the one or more smart contracts 110 can analyze the LCE submission to identify accounting redundancies, such as the double counting of expenditures. For instance, the one or more smart contracts 110 can compare the data entered into one or more first data fields of the LCE submission with data entered into one or more second data fields of the LCE submission to identify instances where the same expenditure characterization is duplicated amongst multiple contexts, which may lead to a redundant counting of the expenditure and thereby an error in the local content score determination. For instance, the one or more smart contracts 110 can execute one or more natural language processing ("NLP") algorithms to analyze the similarity of respective data entries. In one or more embodiments, the NLP algorithm can be stored within the computer readable storage media 204 as one or more computer executable instructions 206. Where the similarity between data entries exceeds a predefined threshold, the smart contract 110 can determine (e.g., via the NLP) that the data entries characterize the same event (e.g., describe the same expenditure).

Additionally, the one or more smart contracts 110 can match one or more submitted LCE submissions with one or more third party certifies based on, for example: information characterizing the enrichment entity associated with the LCE submission (e.g., where the enrichment entity is incorporated), one or more details defined in the LCE submission (e.g., the LCE submission can define a business sector from a pool of possible business sectors, where respective third party certifiers are associated with respective business sectors), an availability of potential approved third party certifiers (e.g., pre-approved by the one or more regional certifiers), a combination thereof, and/or the like.

In various embodiments, the enrichment entity entering the LCE submission can choose a pre-approved third party certifier and identify the selected third party certifier in the LCE submission itself. Thereby, the one or more smart contracts 110 can identify the selected third party certifier via the details defined in the LCE submission. Further, the one or more smart contracts 110 can generate one or more alerts to notify the one or more third party certifiers of a recorded, associated LCE submission. For instance, the one or more smart contracts 110 can generate one or more alerts notifying one or more correlated third party certifiers based on one or more matching operations described herein. In another instance, the one or more smart contracts 110 can generate one or more alerts notifying one or more identified third party certifiers based on the association defined by the given LCE submission.

In one or more embodiments, the one or more third party certifiers can employ the one or more third party certifier user interfaces 108 to receive one or more notifications (e.g., generated by the one or more smart contracts 110) regarding an LCE submission recorded to the blockchain 112 (e.g., via the blockchain layer 102). Additionally, the one or more third party certifiers can audit an associated LCE submission to generate one or more certification reports. For example, upon being notified of an LCE submission's recordation to the blockchain layer 102, the one or more third party certifiers can review the LCE submission to: verify accuracy of the contents of the LCE submission, and/or verify whether the proposals of the LCE submission meet one or more LCRs for the given region (e.g., defined by one or more authorities governing the region).

Further, the one or more third party certifiers can generate one or more certification reports characterizing the results, findings, and/or conclusions of the audit. For example, the certification reports can include one or more SLAs generated by third party certifiers based on the content of the LCE submission and/or one or more LCRs governing the region. For instance, the one or more SLAs can define one or more services to be rendered by the enrichment entity along with one or more performance metrics by which the services are to be measured. Moreover, the SLA can stipulate timelines and/or benchmarks associated with the performance metrics. The services included in the SLA can be based on the content of the LCE submission. The one or more performance metrics can be based on, for example: best practices in the given business sector, legal regulations governing the region, one or more LCRs, a combination thereof, and/or the like. Additionally, the one or more SLAs can include remedies and/or penalties for breaching the agreement. The one or more third party certifiers can employ the one or more third party certifier user interfaces 108 to record the certification report (e.g., including the service level agreement) to the blockchain 112 via the blockchain layer 102.

In various embodiments, the one or more enrichment entities can employ the one or more enrichment entity user interfaces 106 to review the one or more certification reports generated by the one or more third party certifiers regarding an entered LCE submission. For example, the one or more enrichment entities can employ the one or more enrichment entity user interfaces 106 to review one or more SLAs (e.g., as stored in the blockchain 112) generated by the one or more third party certifiers. In one or more embodiments, recordation of the certification report to the blockchain 112 (e.g., by the one or more third party certifiers, via the blockchain layer 102) can trigger one or more smart contracts 110 to generate one or more alerts notifying the enrichment entity associated with the LCE submission characterized by the certification report. For example, the one or more alerts can inform the enrichment entity of the generated certification report, include a copy of the certification repot, and/or identify how the certification report can be viewed from the blockchain 112.

Further, the one or more enrichment entities can employ the one or more enrichment entity user interfaces 106 to acknowledge the certification report, which can include acceptance of the associated SLA. For instance, acceptance of the certification report (e.g., including the SLA) can be recorded on the blockchain 112 using digital signatures with a private-public encryption key pairing. In one or more embodiments, the one or more enrichment entities can append the acknowledged certification report (e.g., including a digitally signed SLA) to the LCE submission to form an LCE package. Further, the one or more enrichment entities can record the LCE package to the blockchain 112 via the blockchain layer 102. In one or more embodiments, the one or more smart contracts 110 can generate an LCE package based on a certification report being acknowledged (e.g., digitally signed) by one or more enrichment entities. For example, once an enrichment entity submits an acknowledged certification report to the blockchain layer 102, the one or more smart contracts 110 can append the acknowledged certification report to the associated LCE submission (e.g., as stored on the blockchain 112) to generate the LCE package (e.g., whereupon the smart contract 110 can record the LCE package to the blockchain 112).

Once the certification report is acknowledged by the one or more enrichment entities, the one or more regional certifiers (e.g., LCGPAs) can employ the one or more regional certifier user interfaces 109 to review the LCE package (e.g., comprising the LCE submission and acknowledge certification report, which can include a digitally signed SLA). In various embodiments, the one or more regional certifiers can be one or more entities of authority tasked with managing and/or enforcing compliance with one or more LCRs of a given region. For example, the one or more regional certifiers can review the LCE package (e.g., as stored on the blockchain 112) and further: provide commentary to initiate one or more revisions (e.g., revisions to the LCE submission and/or SLA); or acknowledge the LCE package (e.g., accept the SLA). Where the one or more regional certifiers have commentary on the LCE package, the one or more regional certifiers can submit the commentary to the blockchain layer 102 for recordation onto the blockchain 112 and subsequent review by the one or more enrichment entities. Upon review of the commentary, the one or more enrichment entities can update the LCE package and record the updates on the blockchain 112 (e.g., via blockchain layer 102) for final acknowledgement and/or approval by the regional certifiers.

Once the one or more regional certifiers (e.g., LCGPAs) acknowledge the LCE package, the acknowledgement can be recorded on the blockchain 112 using digital signatures with a private-public encryption key pairing. In one or more embodiments, the one or more smart contracts 110 can further be configured to generate one or more alerts and/or notifications informing the one or more enrichment entities upon the recording of: a certification report to the blockchain 112; the recording of regional certifier commentary to the blockchain 112, where the commentary is associated with a given LCE package; and/or regional certifier acknowledgement (e.g., acceptance) of a given LCE package to the blockchain 112.

Moreover, the one or more regional certifiers (e.g., LCGPAs) can employ the one or more regional certifier user interfaces 109 to reflect the acknowledged LCE package on supply chain and/or procurement systems, as recorded on the blockchain 112. As shown in FIG. 1, the system 100 can further comprise one or more application programming interfaces ("APIs") 118 that can be configured to define interface points between the blockchain layer 102 (e.g., in particular one or more smart contracts 110) and existing supply chain and procurement systems 120. The integration with the existing supply chain and procurement systems 120 can be enabled by one or more events triggered by the blockchain layer 102, which can be based on pre-configured conditions representing system actions. The triggered events can be fed to the one or more APIs 118 to trigger pre-specified tasks to be actioned by the supply chain and procurement systems 120. For example, where a regional certifier acknowledges (e.g., digitally signs) an LCE package and records said acknowledgement to the blockchain 112 (e.g., via the blockchain layer 102), a the one or more APIs 118 can trigger a workflow in the supply chain and procurement systems 120 that routes a copy of the record to one or more databases and/or archives.

FIG. 2 illustrates a diagram of an example, non-limiting blockchain node 104 that can be utilized by the system 100 to manage the blockchain layer 102 and/or record data to the blockchain 112 in accordance with one or more embodiments described herein. In various embodiments, the blockchain nodes 104 can be, for example, a server, a desktop computer, a laptop, a hand-held computer, a programmable apparatus, a minicomputer, a mainframe computer, an Internet of things ("IoT") device, and/or the like. As shown in FIG. 2, the blockchain nodes 104 can comprise one or more processing units 202 and/or computer readable storage media 204.

In various embodiments, the computer readable storage media 204 can store one or more computer executable instructions 206 that can be executed by the one or more processing units 202 to perform one or more defined functions. In various embodiments, one or more components of the blockchain layer 102 (e.g., such as the smart contracts 110 and/or a digital signer 207) and/or the other service layers 116 can be computer executable instructions 206 and/or can be hardware components operably coupled to the one or more processing units 202. For instance, in some embodiments, the one or more processing units 202 can execute the smart contracts 110 and/or the digital signer 207 to perform various functions described herein. Additionally, the computer readable storage media 206 can store a copy of the blockchain 112, a certifier database 208, and/or a service level agreement ("SLA") conditions database 210.

The one or more processing units 202 can comprise any commercially available processor. For example, the one or more processing units 202 can be a general purpose processor, an application-specific system processor ("ASSIP"), an application-specific instruction set processor ("ASIPs"), or a multiprocessor. For instance, the one or more processing units 202 can comprise a microcontroller, microprocessor, a central processing unit, and/or an embedded processor. In one or more embodiments, the one or more processing units 202 can include electronic circuitry, such as: programmable logic circuitry, field-programmable gate arrays ("FPGA"), programmable logic arrays ("PLA"), an integrated circuit ("IC"), and/or the like.

The one or more computer readable storage media 204 can include, but are not limited to: an electronic storage device, a magnetic storage device, an optical storage device, an electromagnetic storage device, a semiconductor storage device, a combination thereof, and/or the like. For example, the one or more computer readable storage media 204 can comprise: a portable computer diskette, a hard disk, a random access memory ("RAM") unit, a read-only memory ("ROM") unit, an erasable programmable read-only memory ("EPROM") unit, a CD-ROM, a DVD, Blu-ray disc, a memory stick, a combination thereof, and/or the like. The computer readable storage media 204 can employ transitory or non-transitory signals. In one or more embodiments, the computer readable storage media 204 can be tangible and/or non-transitory. In various embodiments, the one or more computer readable storage media 204 can store the one or more computer executable instructions 206 and/or one or more other software applications, such as: a basic input/output system ("BIOS"), an operating system, program modules, executable packages of software, and/or the like.

The one or more computer executable instructions 206 can be program instructions for carrying out one or more operations described herein. For example, the one or more computer executable instructions 206 can be, but are not limited to: assembler instructions, instruction-set architecture ("ISA") instructions, machine instructions, machine dependent instructions, microcode, firmware instructions, state-setting data, configuration data, source code, object code, a combination thereof, and/or the like. For instance, the one or more computer executable instructions 206 can be written in one or more procedural programming languages. Although FIG. 2 depicts the computer executable instructions 214 stored on computer readable storage media 204, the architecture of the system 100 is not so limited. For example, the one or more computer executable instructions 206 can be embedded in the one or more processing units 202.

In various embodiments, the one or more smart contracts 110 can reference one or more certifier databases 208 in correlating one or more recorded LCE submissions with a third party certifier in accordance with one or more embodiments described herein. For example, the one or more certifier databases 208 can include one or more lists of approved third party certifiers. For instance, third party certifiers can be pre-approved by one or more governing entities regulating the region to which the LCE submission is directed. In one or more embodiments, third party certifiers can be pre-approved by the one or more regional certifiers. Additionally, one or more governing entities (e.g., regional certifiers, such as LCGPAs) can update and/or maintain the certifier database 208 as third party certifiers are newly approved or have their approval revoked. In one or more embodiments, the certifier database 208 can sort the approved third party certifiers according to one or more features, such as business sector expertise. Further, the certifier database 208 can include unique identifiers associated with each of the approved third party certifiers, and/or a unique digital address associated with each of the approved third party certifiers. In one or more embodiments, the certifier database 208, and/or updates thereto, can be recorded onto the blockchain 112 and/or the computer readable storage media 204 can include a copy thereof.

As described herein, the one or more smart contracts 110 can perform one or more matching operations to correlate a LCE submission recorded to the blockchain 112 with a third party certifier. In one or more embodiments, the one or more smart contracts 110 can match a third party certifier from the certifier database 208 to a given LCE submission based on a defined employment sequence. For example, the employment sequence can define a sequential order of the third party certifiers, with each new LCE submission being matched to the next third party certifier in the order. In one or more embodiments, the one or more smart contracts 110 can match a third party certifier from the certifier database 208 to a given LCE submission based on a random or pseudo random selection protocol. In one or more embodiments, the one or more smart contracts 110 can match a third party certifier from the certifier database 208 to a given LCE submission based on a comparison of a third party certifier identification included in the LCE submission and the unique identifiers included in the certifier database 208.

Upon matching an LCE submission to a third party certifier, the one or more smart contracts 110 can further generate one or more alerts and/or notifications informing the third party certifier in accordance with one or more embodiments described herein. For example, the one or more alerts and/or notifications can include details of the LCE submission, such as: a unique identifier associated with the LCE submission (e.g., to facilitate identification of the LCE submission on the blockchain 112), a timestamp associated with entry of the LCE submission onto the blockchain layer 102 and/or recordation to the blockchain 112, an identification of one or more enrichment entities associated with the LCE submission, a combination thereof, and/or the like. Additionally, the one or more smart contracts 110 can be configured to send the one or more alerts and/or notifications to a digital address associated with the matched third party certifier (e.g., as defined in the certifier database 208).

In one or more embodiments, the one or more certification reports can be generated based on one or more terms and/or conditions included in the SLA conditions database 210. The SLA conditions database 210 can include pre-approved terms and/or conditions regarding, for example: a minimum scope of services, performance metrics, legal provisions, contract terms and/or definitions, LCRs for specified regions, agreement templates, a combination thereof, and/or the like. In one or more embodiments, the certification reports can include one or more SLAs comprising one or more provisions extracted from the SLA conditions database 210. In one or more embodiments, terms and/or conditions included in the SLA conditions database 210 can be pre-approved by one or more governing entities regulating the region to which the LCE submission is directed (e.g., pre-approved by the one or more regional certifiers). In one or more embodiments, the SLA conditions database 210, and/or updates thereto, can be recorded onto the blockchain 112 and/or the computer readable storage media 204 can include a copy thereof.

In one or more embodiment, the digital signer 207 can be employed to execute acknowledgement and/or acceptance of certification reports and/or LCE packages. For example, one or enrichment entities can utilize the one or more enrichment entity user interfaces 106 to employ the digital signer 207 to record one or more digital signatures to the blockchain 112, where the one or more digital signatures can regard the acknowledgement and/or acceptance of one or more certification reports by the one or more enrichment entities in accordance with one or more embodiments described herein. In another example, the one or more regional certifiers can utilize the one or more regional certifiers user interfaces 109 to employ the digital signer 207 to record one or more digital signatures to the blockchain 112, where the one or more digital signatures can regard the acknowledgement and/or acceptance of one or more LCE packages and associated, acknowledged certification reports by the one or more regional certifiers.

In one or more embodiments, the digital signer 207 can be utilized to perform one or more signing operations that validate the authenticity and/or integrity of documents sent by one or more parties using the system 100 (e.g., one or more enrichment entities, third party certifiers, and/or regional certifiers). For example, one or more enrichment entities can employ a digital signer 207 to acknowledge and/or accept one or more certification reports generated by the one or more third party certifiers regarding one or more LCE submission supplied by the one or more enrichment entities.

For example, the one or more enrichment entities can employ a digital signer 207 to digitally sign an LCE package that includes the LCE submission reviewed by the third party certifier and the associated certification report generated by the third party certifier. For instance, the one or more enrichment entities can employ the digital signer 207 to sign one or more SLAs included in the LCE package. In one or more embodiments, the digital signer 207 can create a hash of the signed LCE package and utilize a private encryption key associated with the one or more enrichment entities to encrypt the LCE package. Additionally, one or more regional certifiers can employ a digital signer 207 to decrypt the LCE package using one or more public encryption keys associated with the one or more business entities associated with the LCE package.

Likewise the one or more regional certifiers can employ the digital signer 207 to sign one or more LCE packages to acknowledge approval. For example, once the regional certifiers approves of an LCE package, the regional certifier can utilize the digital signer 207 to sign the LCE package (e.g., sign the SLA) and record acknowledge of the approved LCE package (e.g., which can include an SLA co-signed by the one or more business entities and regional certifiers) to the blockchain 112.

Figure 3:
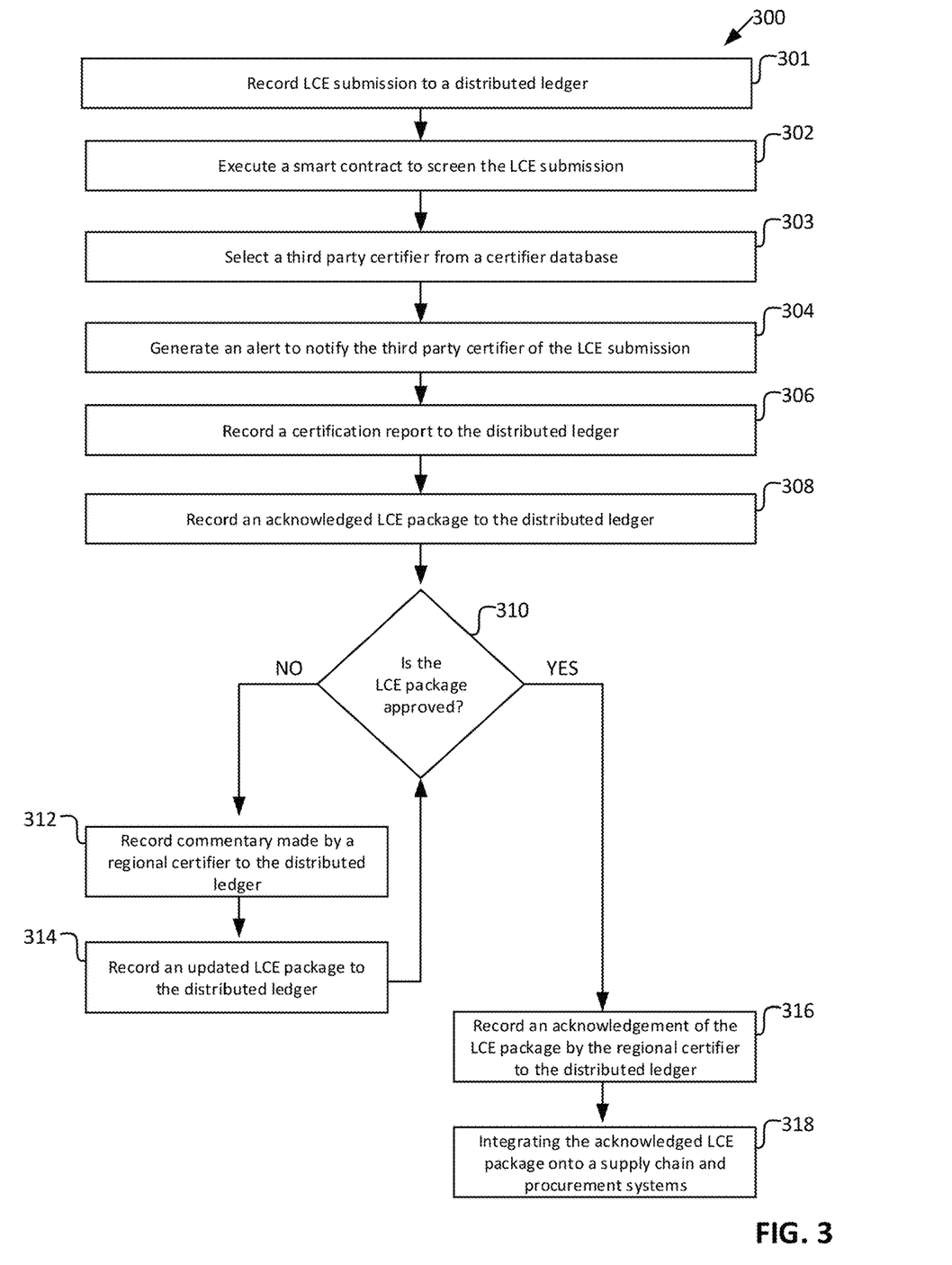
FIG. 3 is a flow diagram of a non-limiting example computer-implemented method that can be implemented by a system to utilize a distributed ledger to track and record local content enrichment submissions in accordance with one or more embodiments described herein.

In view of the foregoing structural and functional features described above, example methods will be better appreciated with reference to FIG. 3. While, for purposes of simplicity of explanation, the example method of FIG. 3 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement the methods.

FIG. 3 illustrates a diagram of a non-limiting example computer-implemented method 300 that can be implemented by the system 100 to provide an LCEP that utilizes blockchain technology in accordance with one or more embodiments described herein. In accordance with various embodiments described herein, the computer-implemented method 300 can be implemented to manage LCR compliance, approval, and/or monitoring between enrichment entities (e.g., business entities seeking to invest in a region), third party certifiers (e.g., pre-approved auditors), and/or regional certifiers (e.g., entities governing compliance with one or more LCRs, such as LCGPAs).

At 301, the computer-implemented method 300 can comprise recording (e.g., via the blockchain layer 102), by a system 100 operably coupled to one or more processing units 202, one or more LCE submissions to a distributed ledger. The one or more LCE submissions can characterize, for example: a plan to increase a region's domestic procurement of goods and/or services, proposed employment opportunities for domestic residents and/or citizens, proposed employment training opportunities for domestic residents and/or citizens, and/or domestic supply chain develop plans. Further, the one or more LCE submissions can include populated forms and/or templates to standardize the format, structure, and/or content of the one or more local content enrichment and/or LCR compliance proposals. In accordance with one or more embodiments described herein, the one or more LCE submissions can be recorded to a blockchain 112 by interfacing with one or more blockchain nodes 104.

At 302, the computer-implemented method 300 can comprise executing (e.g., via the blockchain layer 102), by the system 100, one or more smart contracts 110 to screen the LCE submission based on one or more pre-defined criteria. In accordance with various embodiments described herein, the one or more smart contracts 110 can compute a local content score (e.g., in accordance with Equation 1) to characterize the LCE submission. Further, the one or more smart contracts 110 can compare the local content score to a pre-defined threshold. Where the computed local content score is less than the pre-defined threshold, the one or more smart contracts 110 can generate one or more alerts notifying the one or more enrichment entities of non-compliance with one or more LCRs and/or regulations. Where the computer local content score is greater than or equal to the pre-defined threshold, the computer-implemented method 300 can proceed to 303.

At 303, the computer-implemented method 300 can comprise selecting (e.g., via the one or more smart contracts 110), by the system 100, a third party certifier from a certifier database 208. In accordance with one or more embodiments described herein, the one or more smart contracts 110 can correlate the LCE submission to one or more third party certifiers included in the certifier database 208 using one or more matching operations described herein.

At 304, the computer-implemented method 300 can comprise generating (e.g., via the blockchain layer 102), by the system 100, one or more alerts to notify one or more third party certifiers of the LCE submission recorded at 302. In accordance with one or more embodiments described herein, one or more smart contracts 110 can be configured to correlate the LCE submission with one or more third party certifiers. For example, in response to recordation of the LCE submission to the blockchain 112; one or more smart contracts 110 can match the LCE submission with a third party certifier identified in one or more certifier databases 208, where the matching operation can be performed based on: identification of the third party certifier in the LCE submission, a sequential order, a business sector identification included in the LCE submission, and/or a randomized selection. The alert can include an identification of the associated LCE submission and serve as a notification to the matched third party certifier to review the LCE submission. For instance, the one or more smart contracts 110 can be configured to send the generated alert to one or more digital addresses associated with the matched third party certifier.

At 306, the computer-implemented method 300 can comprise recording (e.g., via the blockchain layer 102), by the system 100, one or more certification reports to the distributed ledger. In accordance with one or more embodiments described herein, the certification report can be generated by the matched third party certifier and can include an SLA that comprises terms and/or conditions based on the proposals of the LCE submission.

At 308, the computer-implemented method 300 can comprise recording (e.g., via the blockchain layer 102), by the system 100, an acknowledged LCE package to the distributed ledger. For example, the one or more enrichment entities associated with the LCE submission can review the certification report recorded at 306. Further, the one or more enrichment entities can digitally sign the certification report (e.g., via the digital signer 207). For instance, the digital signature can be an indication of acknowledged approval of one or more SLAs included in the certification report. The LCE package can include the acknowledged certification report (e.g., including one or more digitally signed SLAs) along with the associated LCE submission, or identification thereof. In one or more embodiments, the LCE package can be generated by one or more smart contracts 110 based on the enrichment entities acknowledgement (e.g., digital signature) of the certification report.

At 310, the computer-implemented method 300 can comprise determining (e.g., via the blockchain layer 102), by the system 100, whether the LCE package is approved. Once the LCE package is recorded to the distributed ledger (e.g., blockchain 112), the one or more regional certifiers can review the LCE package and provide commentary or approval. In one or more embodiments, the one or more smart contracts 110 can generate one or more alerts notifying the one or more regional certifiers of recordation of an acknowledged LCE package. Further, the one or more smart contracts 110 can send the alerts to one or more digital addresses associated with the one or more regional certifiers.

Where the regional certifier does not approve the LCE package, the regional certifier can generate one or more comments regarding the reasons for disproval. For example, the one or more regional certifiers can employ the one or more regional certifier user interfaces 109 to enter commentary into the system 100. Further, at 312 the computer-implemented method 300 can comprise recording (e.g., via the blockchain layer 102), by the system 100, the commentary generated by the one or more regional certifiers to the distributed ledger (e.g., blockchain 112). By recording the commentary to the distributed ledger, the one or more enrichment entities are able to review the commentary and make adjustments to the LCE package to generate an updated LCE package.

Further, the one or more enrichment entities can utilize the digital signer 207 to digitally sign the updated LCE package. For instance, the one or more enrichment entities can use a digital signer 207 can utilize the private encryption key of the enrichment entity to encrypt the updated LCE package, and the one or more regional certifiers can use a digital signer 207 to decrypt the updated LCE package using the public encryption key of the enrichment entity to validate and authenticate the integrity of the updated LCE package. At 314, the computer-implemented method 300 can comprise recording (e.g., via the blockchain layer 102), by the system 100, the updated LCE package to the distributed ledger for further review by the one or more regional certifiers. For example, the one or more smart contracts 110 can be configured to generate one or more alerts notifying the one or more regional certifiers of the updated LCE package in accordance with various embodiments described herein. Subsequently, the computer-implemented method 300 can proceed again to feature 310. As shown in FIG. 3, the computer-implemented method 300 can repeat features 312 and 314 until the LCE package has been updated (e.g., based on regional certifier commentary) sufficiently enough for approval.

At 316, the computer-implemented method 300 can comprise recording (e.g., via blockchain layer 102), by the system 100, an acknowledgement of the LCE package (e.g., the latest, updated version of the LCE package) by the one or more regional certifiers to the distributed ledger (e.g., blockchain 112). For example, upon approval of the LCE package, the one or more regional certifiers can utilize a digital signer 207 to digitally sign the LCE package (e.g., digitally sign one or more SLAs of the LCE package) and record the co-signed (e.g., by the enrichment entity and the regional certifier) LCE package onto the blockchain 112.

Thus, the computer-implemented method 300 can comprising tracking the status of the LCE submission via transactions to the distributed ledger (e.g., blockchain 112) via features 302-316. For instance, the computer-implemented method can record generation of the certification report by the third party certifier, acknowledgement of the certification report by the one or more enrichment entities, review of the LCE package by the one or more regional certifiers, updates to the LCE package by the one or more enrichment entities, and/or acknowledgement of the LCE package by the one or more regional certifiers. Likewise, the system 100 can implement the computer-implemented method 300 to track the status of the LCE submission, certification report, and/or LCE package in accordance with one or more embodiments described herein.

Moreover, the regional certifier can further utilize the distributed ledger to monitor one or more terms and/or conditions of the approved LCE package. For example, where the LCE compliance package delineates one or more performance targets to be accomplished by a deadline, the one or more enrichment entities can record (e.g., via the blockchain layer 102) evidence (e.g., supporting documentation) characterizing on-time achievement of the targets for review by the one or more regional certifiers.

At 316, the computer-implemented method 300 can comprise integrating (e.g., via the blockchain layer 102 and/or smart contracts 110), by the system 100, the acknowledged LCE package onto one or more existing supply chain and procurement systems 120. In accordance with one or more embodiments described herein, recording the acknowledged LCE package onto the blockchain 112 can trigger one or more smart contracts 110 to interface with one or more APIs 118 to record a copy of the record onto one or more existing supply chain and procurement systems 120.

In view of the foregoing structural and functional description, those skilled in the art will appreciate that portions of the embodiments may be embodied as a method, data processing system, or computer program product. Accordingly, these portions of the present embodiments may take the form of an entirely hardware embodiment, an entirely software embodiment, or an embodiment combining software and hardware, such as shown and described with respect to the computer system of FIG. 4. Furthermore, portions of the embodiments may be a computer program product on a computer-usable storage medium having computer readable program code on the medium. Any non-transitory, tangible storage media possessing structure may be utilized including, but not limited to, static and dynamic storage devices, hard disks, optical storage devices, and magnetic storage devices, but excludes any medium that is not eligible for patent protection under 35 U.S.C. § 101 (such as a propagating electrical or electromagnetic signal per se). As an example and not by way of limitation, a computer-readable storage media may include a semiconductor-based circuit or device or other IC (such, as for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, nonvolatile, or a combination of volatile and non-volatile, where appropriate.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Figure 4:
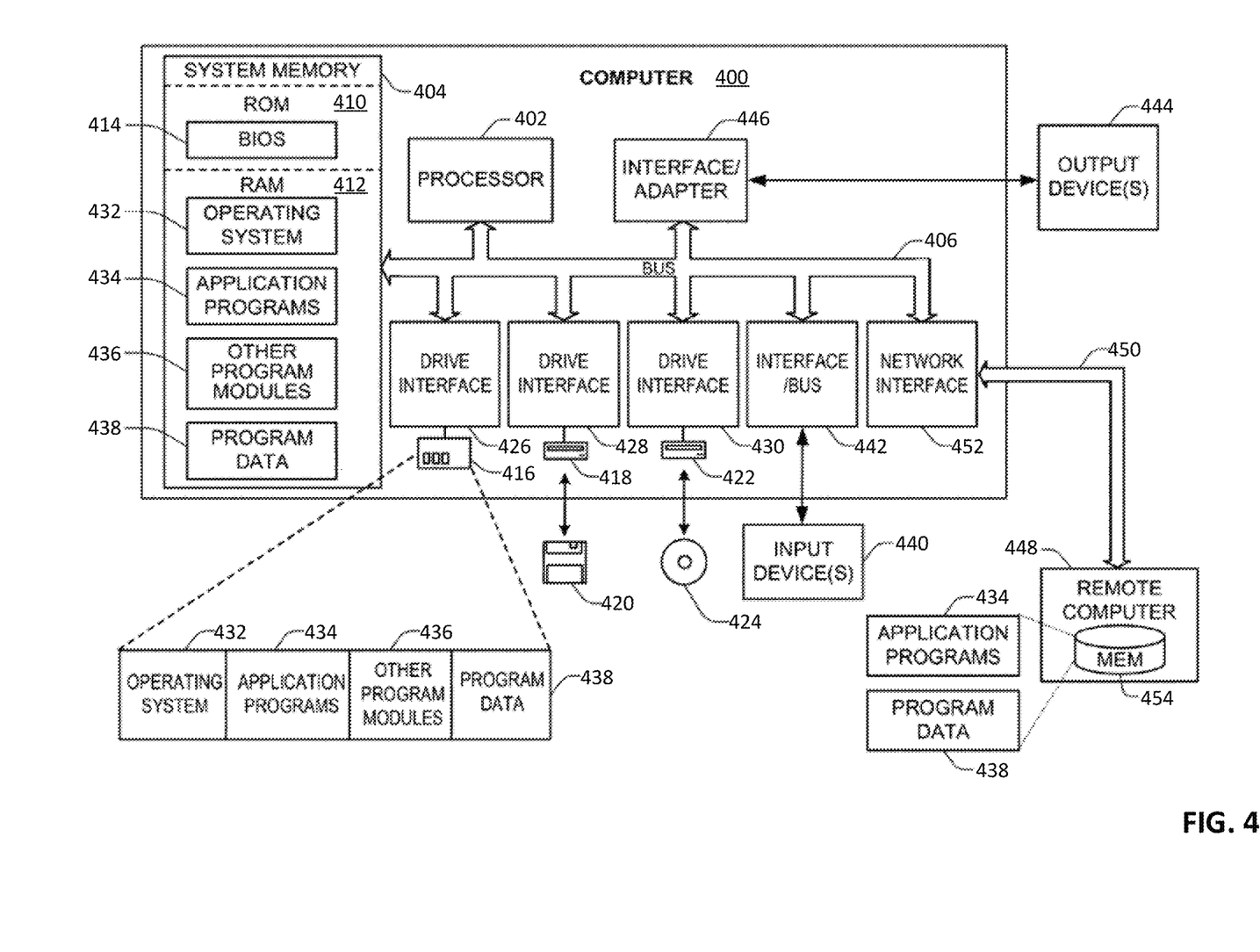
FIG. 4 illustrates a block diagram of non-limiting example computer environment that can be implemented within one or more systems described herein.

In this regard, FIG. 4 illustrates one example of a computer system 400 that can be employed to execute one or more embodiments of the present disclosure. Computer system 400 can be implemented on one or more general purpose networked computer systems, embedded computer systems, routers, switches, server devices, client devices, various intermediate devices/nodes or standalone computer systems. Additionally, computer system 400 can be implemented on various mobile clients such as, for example, a personal digital assistant (PDA), laptop computer, pager, and the like, provided it includes sufficient processing capabilities.

Computer system 400 includes processing unit 402, system memory 404, and system bus 406 that couples various system components, including the system memory 404, to processing unit 402. Dual microprocessors and other multi-processor architectures also can be used as processing unit 402. System bus 406 may be any of several types of bus structure including a memory bus or memory controller, a peripheral bus, and a local bus using any of a variety of bus architectures. System memory 404 includes read only memory (ROM) 410 and random access memory (RAM) 412. A basic input/output system (BIOS) 414 can reside in ROM 410 containing the basic routines that help to transfer information among elements within computer system 400.

Computer system 400 can include a hard disk drive 416, magnetic disk drive 418, e.g., to read from or write to removable disk 420, and an optical disk drive 422, e.g., for reading CD-ROM disk 424 or to read from or write to other optical media. Hard disk drive 416, magnetic disk drive 418, and optical disk drive 422 are connected to system bus 406 by a hard disk drive interface 426, a magnetic disk drive interface 428, and an optical drive interface 430, respectively. The drives and associated computer-readable media provide nonvolatile storage of data, data structures, and computer-executable instructions for computer system 400. Although the description of computer-readable media above refers to a hard disk, a removable magnetic disk and a CD, other types of media that are readable by a computer, such as magnetic cassettes, flash memory cards, digital video disks and the like, in a variety of forms, may also be used in the operating environment; further, any such media may contain computer-executable instructions for implementing one or more parts of embodiments shown and described herein.

A number of program modules may be stored in drives and RAM 410, including operating system 432, one or more application programs 434, other program modules 436, and program data 438. In some examples, the application programs 434 can include blockchain layer 102, smart contracts 110, digital signer 207, and/or other service layers 116, and the program data 438 can include certifier database 208, SLA conditions database 210, and/or blockchain 112. The application programs 434 and program data 438 can include functions and methods programmed to record and track the status of LCE submissions, certification reports, and LCE packages, such as shown and described herein.

A user may enter commands and information into computer system 400 through one or more input devices 440, such as a pointing device (e.g., a mouse, touch screen), keyboard, microphone, joystick, game pad, scanner, and the like. For instance, the user can employ input device 440 to edit or modify the LCE submissions and/or LCE packages. These and other input devices 440 are often connected to processing unit 402 through a corresponding port interface 442 that is coupled to the system bus, but may be connected by other interfaces, such as a parallel port, serial port, or universal serial bus (USB). One or more output devices 444 (e.g., display, a monitor, printer, projector, or other type of displaying device) is also connected to system bus 406 via interface 446, such as a video adapter.

Computer system 400 may operate in a networked environment using logical connections to one or more remote computers, such as remote computer 448. Remote computer 448 may be a workstation, computer system, router, peer device, or other common network node, and typically includes many or all the elements described relative to computer system 400. The logical connections, schematically indicated at 450, can include a local area network (LAN) and a wide area network (WAN). When used in a LAN networking environment, computer system 400 can be connected to the local network through a network interface or adapter 452. When used in a WAN networking environment, computer system 400 can include a modem, or can be connected to a communications server on the LAN. The modem, which may be internal or external, can be connected to system bus 406 via an appropriate port interface. In a networked environment, application programs 434 or program data 438 depicted relative to computer system 400, or portions thereof, may be stored in a remote memory storage device 454.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, as used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A system, comprising:
   memory to store computer executable instructions; and
   one or more processors, operatively coupled to the memory, that execute the computer executable instructions to implement:
   at least one blockchain layer configured to:
      record, via a distributed ledger and at a plurality of blockchain nodes, a local content enrichment submission, the local content enrichment submission including data characterizing a proposal of an entity to comply with local content regulations of a region;
      track a status of the local content enrichment submission via transactions with the distributed ledger; and
      record, via a distributed ledger and at a plurality of blockchain nodes, a local content enrichment package to the distributed ledger, wherein the local content enrichment package includes a certification report digitally acknowledged by an enrichment entity and appended to the local content enrichment submission.

2. The system of claim 1, further comprising:
   a smart contract configured to generate an alert notifying a pre-approved certifier that the local content enrichment submission is recorded via or at the distributed ledger.

3. The system of claim 2, wherein the smart contract is further configured to select the pre-approved certifier from a certifier database based on the local content enrichment submission being recorded via or at the distributed ledger.

4. The system of claim 3, wherein the blockchain layer is further configured to record the certification report, the certification report generated by the pre-approved certifier via or at the distributed ledger, and including a service level agreement associated with the local content enrichment submission.

5. The system of claim 1, wherein the local content enrichment submission includes a local content score.

6. The system of claim 4, wherein the blockchain layer is further configured to record commentary by a regional certifier via or at the distributed ledger, wherein the commentary identifies a disapproved feature of the local content enrichment package.

7. The system of claim 4, wherein the blockchain layer is further configured to record a digital acknowledgement of the local content enrichment package by a regional certifier via or at the distributed ledger.

8. The system of claim 7, further comprising an application program interface configured to interface with the smart contract to integrate the digital acknowledgement into a supply chain and procurement system based on the digital acknowledgement being recorded via or at the distributed ledger.

9. A method, comprising:
recording, via a distributed ledger and at a plurality of blockchain nodes, a local content enrichment submission, wherein the local content enrichment submission includes data characterizing a proposal of an entity to comply with local content regulations of a region; and
tracking a status of the local content enrichment submission via transactions with the distributed ledger; and
record, via a distributed ledger and at a plurality of blockchain nodes, a local content enrichment package to the distributed ledger, wherein the local content enrichment package includes a certification report digitally acknowledged by an enrichment entity and appended to the local content enrichment submission.

10. The method of claim 9, further comprising:
selecting a pre-approved certifier from a certifier database based on the local content enrichment submission being recorded via or at the distributed ledger.

11. The method of claim 10, further comprising:
generating an alert that notifies the pre-approved certifier that the local content enrichment submission is recorded via or at the distributed ledger.

12. The method of claim 11, further comprising:
recording the certification report, the certification report generated by the pre-approved certifier via or at the distributed ledger and including a service level agreement associated with the local content enrichment submission.

13. The method of claim 9, further comprising:
recording a digital acknowledgement of the local content enrichment package by a regional certifier via or at the distributed ledger.

14. The method of claim 13, further comprising:
interfacing with the smart contract to integrate the digital acknowledgement into a supply chain and procurement system based on the digital acknowledgement being recorded via or at the distributed ledger.

15. The method of claim 9, wherein the local content enrichment submission includes a local content score.

* * * * *